Oct. 18, 1966  L. H. BARRON  3,279,126
MACHINE FOR GENERATING SURFACES ON HARD MATERIALS
Filed Feb. 14, 1964  2 Sheets-Sheet 1

INVENTOR
LEE H. BARRON
BY
ATTORNEY

Oct. 18, 1966   L. H. BARRON   3,279,126
MACHINE FOR GENERATING SURFACES ON HARD MATERIALS
Filed Feb. 14, 1964   2 Sheets-Sheet 2

INVENTOR
LEE H. BARRON
BY
ATTORNEY 3,279,126
MACHINE FOR GENERATING SURFACES
ON HARD MATERIALS
Lee H. Barron, La Canada, Calif.
(612 W. Elk Ave., Glendale 4, Calif.)
Filed Feb. 14, 1964, Ser. No. 344,939
5 Claims. (Cl. 51—105)

This invention relates to a machine for generating a wide variety of surfaces especially on hard materials, through the use of diamond coated tools.

The modern development of unusually dense and hard solids for use in missile and space research and operations—materials for examples such as fused aluminum oxide, silicon carbide, silicon nitride, special ceramics, and glasses—are prepared in the desired forms only with great difficulty, nearly always and necessarily by the use of diamond coated tools. The available machines are not adequate for making optimum use of the available diamond coated rotary tools for generating surfaces on such materials.

One object of this invention is to provide a surface generating machine which is capable of cutting and grinding blanks of hard solids into a large variety of surfaces and configurations.

Another object is to provide a surface generator for producing a large variety of surfaces on blanks of hard material, incorporating machine elements which in combination provide paths of travel for a diamond tool relative to the work piece in virtually every direction.

These and other objects are attained by my invention which will be understood from the following description, reference being made to the accompanying drawings in which FIG. 1 is a perspective front view illustrating one form of this invention;

Figure 1:
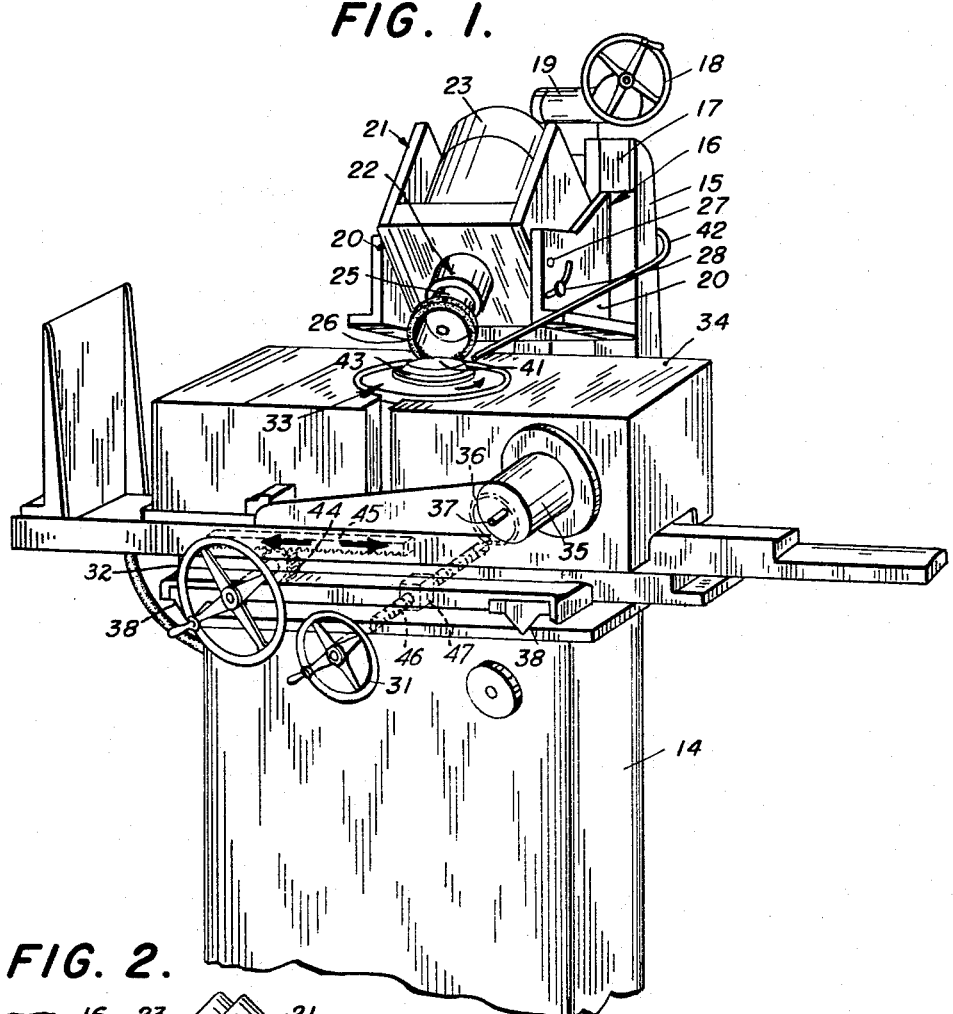
Figure 2:
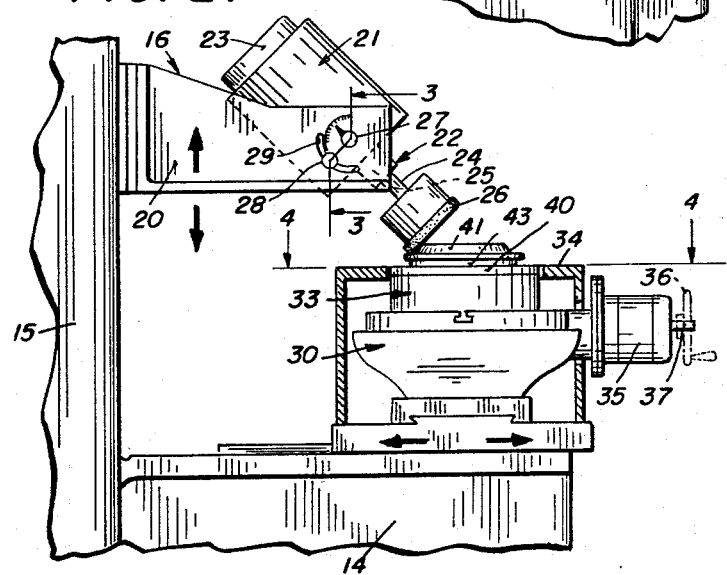
FIG. 2 is a side elevational view partly in section showing the machine of FIG. 1.
Figure 3:
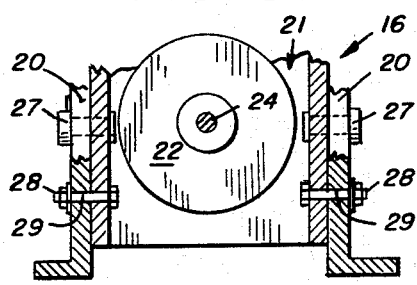
FIG. 3 is a fragmentary cross-sectional view taken on line 3—3 of FIG. 2.
Figure 4:
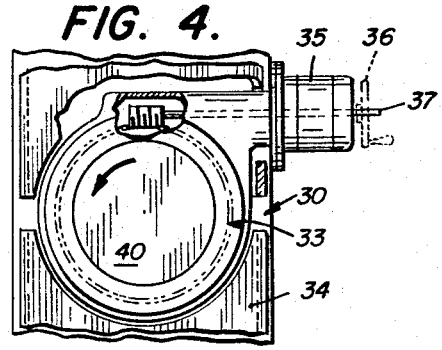
FIG. 4 is a fragmentary cross-sectional view taken on the line 4—4 of FIG. 2.

Referring to the drawings, FIGS. 1 to 4, a supporting base member 14 rests upon the floor, there being a vertical column 15 extending upwardly from the back of the base 14 at the center thereof. The column 15 is provided with a head member 16 which is arranged to move up and down in racks 17 on the column 15, a handwheel 18 being provided to actuate a driving gear means 19. The head member 16 has a pair of bracket arms 20, which extend over the base member 14 and support a frame 21 for a rotary grinder 22 which consists of a motor 23 having a shaft 24 at the lower end of which is a chuck 25 for removably holding a diamond coated rotary tool 26. The frame 21 is pivoted on the bracket arms 20 on pivot pins 27. The angular position of the shaft 24 may be set as desired within the range from vertical to horizontal, by a locking bolt 28 on each side of the bracket 16 extending through the slots 29 in the bracket arms 20.

The base member 14 supports on its upper horizontal surface a longitudinally reciprocable member 30 upon which is mounted a rotatable horizontal table 33 which is centered in the top of an elongated work support member 34 attached to the reciprocable member 30. Motor drive means 35 is provided on the work support member 34 for rotating the table 33, there being an alternative hand wheel means 36 affixed on the shaft 37 of the motor 35 for hand setting the angular position of the rotatable table 33 when the motor is not in use, and when the table is not being rotated. Conventional means, not shown, for longitudinally reciprocating the member 30 are provided, the length of the stroke being set by positioning the adjustable stops 38.

The longitudinally reciprocable member 30 and associated parts may be moved as a unit forwardly and backwardly relative to the vertical column 15 by means of the hand wheel 31 and an associated screw 46 and follower means 47 (shown in broken lines); and the longitudinal position relative to the vertical column may also be adjusted by means of the hand wheel 32 and associated pinion 44 and rack 45 (shown in broken lines). The rotatable table 33 may be continuously rotated by the motor means 35.

The top of the rotatable table 33 includes a permanent magnet plate 40, which magnetically holds the work piece if it is paramagnetic, or holds a separable work holder 43 of iron or steel, to whose top surface a non-magnetic work piece 41 may be adhesively attached, using, for example a thermo-plastic adhesive such as a beeswax and rosin mix.

Cutting liquid may be directed to the point of contact of the tool and workpiece by a flexible tubular feed pipe 42 operatively connected to a liquid source.

It will be obvious that the several hand controls above indicated permit the orientation of a blank or work piece and the subsequent movement of the work piece either in rotation, or translation left to right, right to left, forward and backward. The rotary diamond coated tool, or other abrasive or cutting tool, may also be raised and lowered vertically by the elevating means on the column 15, and the tool may be tilted to any axial position from vertical to horizontal. Thus the several adjustments of the work table 33, together with the vertical and angular adjustments provided for the rotary tool, provide means for forming a wide variety of contours on a mounted work piece by means of suitably shaped diamond coated rotary tools.

Illustrative examples of varieties of shaping cuts which may be made are shown in FIGS. 5 to 10.

Figure 5:
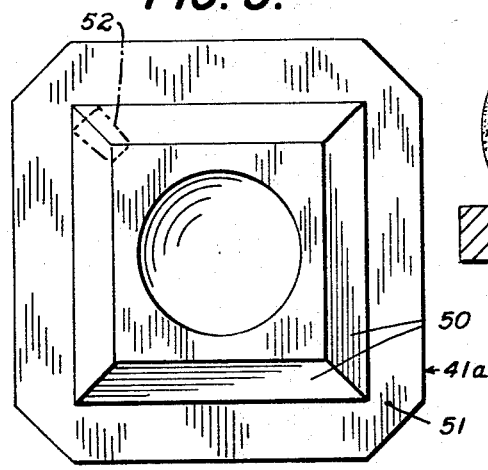
FIG. 5 shows a square tablet of hard material with the outer edges provided with a bevel produced by means of a cup wheel.

FIG. 5 illustrates the cutting of external bevels 50 on the four edges of a squared work piece 41a by suitably moving the work table rectilinearly with reference to each side, under the grinding action of a rotating diamond coated cylindrical wheel 52 mounted at the selected angle for the grinder.

Figure 6:
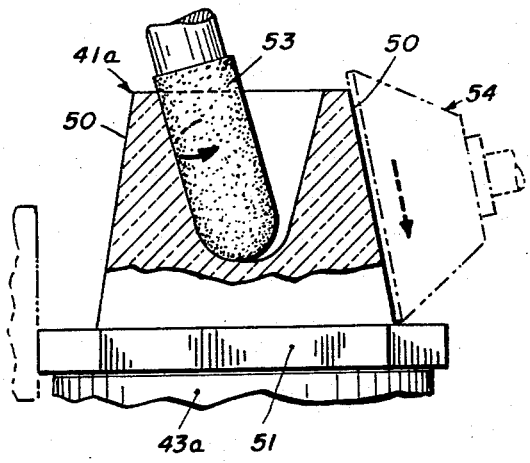
FIG. 6 is a side elevational view partly in section showing a work piece being shaped externally as a cone and with an inverted conical cavity.

FIG. 6 shows a block 41a of hard material cemented on a magnetically held work holder 43a, showing the enlargement of a cavity in the block by use of the rotating work table, and a rotating diamond coated burr tool 53 positioned at a small angle from the vertical. A conical exterior side may also be formed in a separate operation by a cup wheel 54 as shown.

Figure 7:
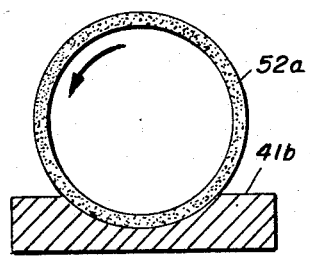
FIG. 7 is a side elevational view partly in section showing a work piece being provided with a cylindrical groove.

FIG. 7 illustrates the cutting of a cylindrical groove in a work piece 41b by a rotating diamond coated cup wheel 52a whose axis is adjusted to a horizontal position; and the work piece is moved forwardly and backwardly with the work table 33.

Figure 8:
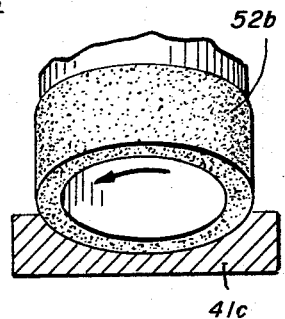
FIG. 8 is a side elevational view partly in section showing a work piece being provided with an elliptical groove.

FIG. 8 shows the cutting of an elliptical shaped groove in a tubular work piece 41c by setting the axis of the diamond coated cup wheel 52b at an angle from horizontal.

Figure 9:
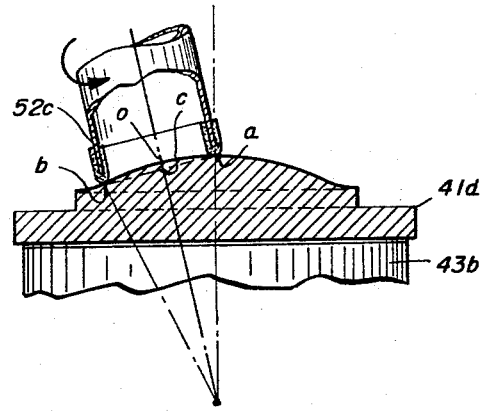
FIG. 9 is a side elevational view partly in section showing a work piece being shaped to a dome.

FIG. 9 shows the manner of generating a dome on a work piece 41a, by rotating the work piece on the work table 33, and applying the diamond coated cylindrical edge of the cup wheel 52c with the axis of the grinder tilted at angles to form the desired spherical surface. The letters a, b, c indicate grinding contact points and o represents the center of rotation of the cup wheel in the plane of the cutting contact points.

While I have shown and described the use of diamond coated wheels, conventional aluminum oxide or silicon carbide grinding wheels may be used on my surface generating machine to cut the aforementioned shapes when the grindable material to be cut is not so hard and dense as to require diamond coated wheels, and for shaping ferrous and non-ferrous alloy and metal work pieces.

In general, diamond coated tools function best at relatively low speeds and my machine of this invention permits this operation.

Other advantages of my surface generating machine for very hard dense materials will be apparent from the above description and typical examples. The objectives stated in the beginning have been attained.

I claim:

1. A machine for generating surfaces on blanks of grindable material comprising a supporting base member having front and back faces; a vertical column attached to the rear face of said base and having a head disposed above the bed of said machine; a longitudinal adjustable bed on said base movable by hand means in directions parallel to said front and back faces, said bed being also by hand means adjustably positioned forwardly and rearwardly relative to said column; a horizontally rotatable work table mounted on said bed, including magnetic for holding the work piece; means for rotating said table; and a motorized rotary grinder means mounted on said head, said grinder means extending over said rotary table, and including a motor shaft, a grinding wheel attached concentrically on said shaft, and means for tilting the axis of said motor and the attached grinding wheel of said grinder means at a selected angle through the range from vertical to horizontal in a vertical plane perpendicular to said bed.

2. A machine for generating surfaces on blanks of grindable material comprising a supporting base member having front and back faces; a vertical column attached to the rear face of said base and having a head disposed above the bed of said machine; a longitudinal adjustable bed on said base movable by hand means in directions parallel to said front and back faces, said bed being also by hand means adjustably positioned forwardly and rearwardly relative to said column; a horizontally rotatable work table mounted on said bed, including magnetic means for holding the work piece; means including a motor for rotating said table; and a motorized rotary grinder means mounted on said head, said grinder means extending over said rotary table, and including a motor shaft, a grinding wheel attached concentrically on said shaft, and means for tilting the axis of said motor and the attached grinding wheel of said grinder means at a selected angle through the range from vertical to horizontal in a vertical plane perpendicular to said bed.

3. A machine for generating surfaces on blanks of grindable material comprising a supporting base member having front and back faces; a vertical column attached to the rear face of said base and having a head disposed above the bed of said machine; a longitudinal adjustable bed on said base movable by hand means in directions parallel to said front and back faces, said bed being also by hand means adjustably positioned forwardly and rearwardly relative to said column; a horizontally rotatable work table mounted on said bed, including magnetic means for holding the work piece; means including a motor and alternatively a hand wheel for rotating said table; and a motorized rotary grinder means mounted on said head, said grinder means extending over said rotary table, and including a motor shaft, a grinding wheel attached concentrically on said shaft, and means for tilting the axis of said motor shaft and the attached grinding wheel of said grinder means at a selected angle through the range from vertical to horizontal in a vertical plane perpendicular to said bed.

4. A machine for generating surfaces on blanks of grindable material comprising a supporting base member having front and back faces; a vertical column attached to the rear face of said base and having a head disposed above the bed of said machine; a longitudinal adjustable bed on said base movable by hand means in directions parallel to said front and back faces, said bed being also by hand means adjustably positioned forwardly and rearwardly relative to said column; means for at times reciprocating said bed longitudinally including stop means for limiting the movement in each direction and for reversing the motion of said bed; a horizontally rotatable work table mounted on said bed, including magnetic means for holding the work piece; means including a motor and alternatively a hand wheel for rotating said table; and a motorized rotary grinder means mounted on said head, said grinder means extending over said rotary table, and including a motor shaft; a grinding wheel attached concentrically on said shaft, and means for tilting the axis of said motor shaft and the attached grinding wheel of said grinder means at a selected angle through the range from vertical to horizontal in a vertical plane perpendicular to said bed.

5. A machine for generating surfaces on blanks of grindable material comprising a supporting base member having front and back faces; a vertical column attached to the rear face of said base and having a head disposed above the base of said machine; a longitudinal adjustable bed on said base movable by hand means in directions parallel to said front and back faces, said bed being also by hand means adjustably positioned forwardly and rearwardly relative to said column; means for at times reciprocating said bed longitudinally including stop means for limiting the movement in each direction and for reversng the motion of said bed; a horizontally rotatable work table mounted on said bed, including magnetic means for holding the work piece; means including a motor and alternatively a hand wheel for rotating said table; and a pair of brackets mounted on said head and extending over said work table; a grinder frame pivotally mounted between and on said brackets; a rotary grinder having a motor and a shaft, mounted on said frame, said grinder frame being tiltable with reference to said brackets to position said motor shaft selectively from a horizontal to a vertical position; and chuck means on said motor shaft adapted to removably hold a diamond coated rotary cutting tool.

References Cited by the Examiner

UNITED STATES PATENTS

| | | | |
|---|---|---|---|
| 1,091,407 | 3/1914 | Walker | 51—131 |
| 1,610,768 | 12/1926 | Graham | 51—132 X |
| 2,101,787 | 12/1937 | Amidon | 51—95.1 |
| 2,124,990 | 7/1938 | Sykes | 51—95.1 |
| 2,142,710 | 1/1939 | Bigelow | 51—105 |
| 2,386,283 | 10/1945 | Wiken et al. | 51—93 |
| 2,395,139 | 2/1946 | Nord et al. | 51—237 |
| 2,540,793 | 2/1951 | Metzger | 51—206 X |
| 2,982,062 | 5/1961 | Jackson et al. | 51—105 X |

LESTER M. SWINGLE, *Primary Examiner.*